United States Patent Office 2,856,328
Patented Oct. 14, 1958

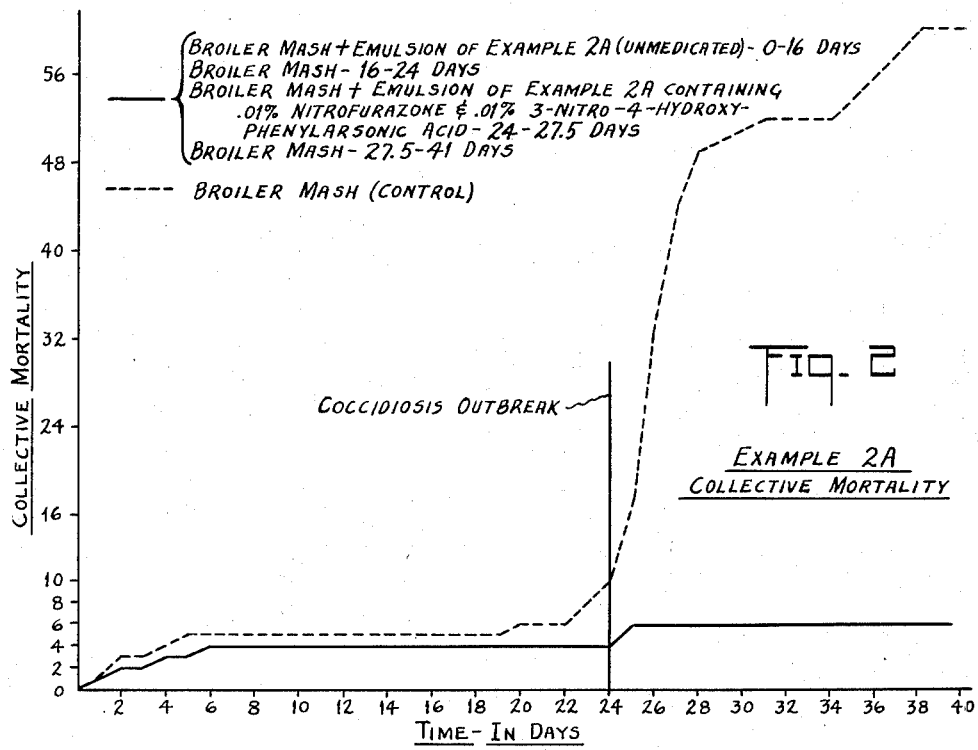
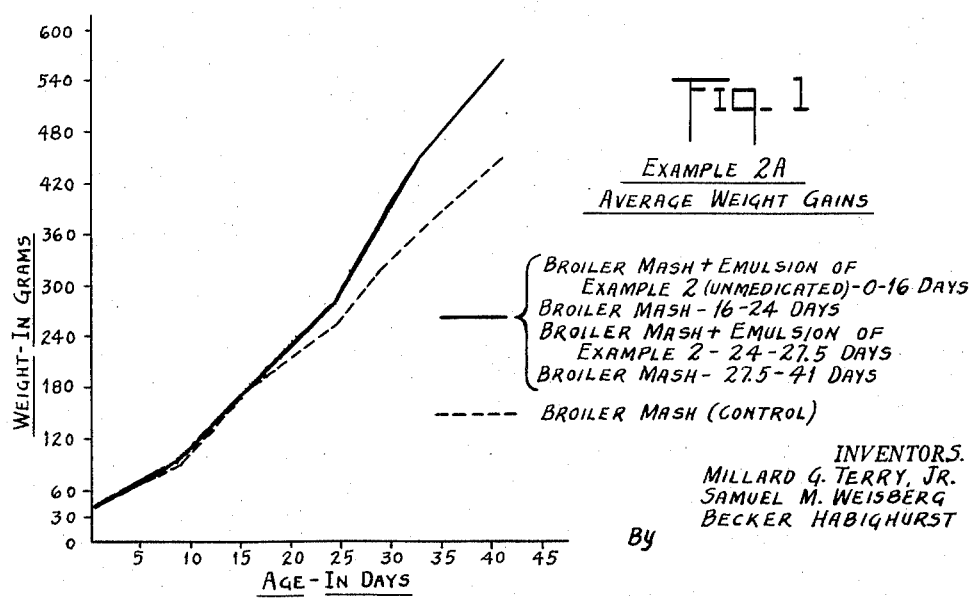

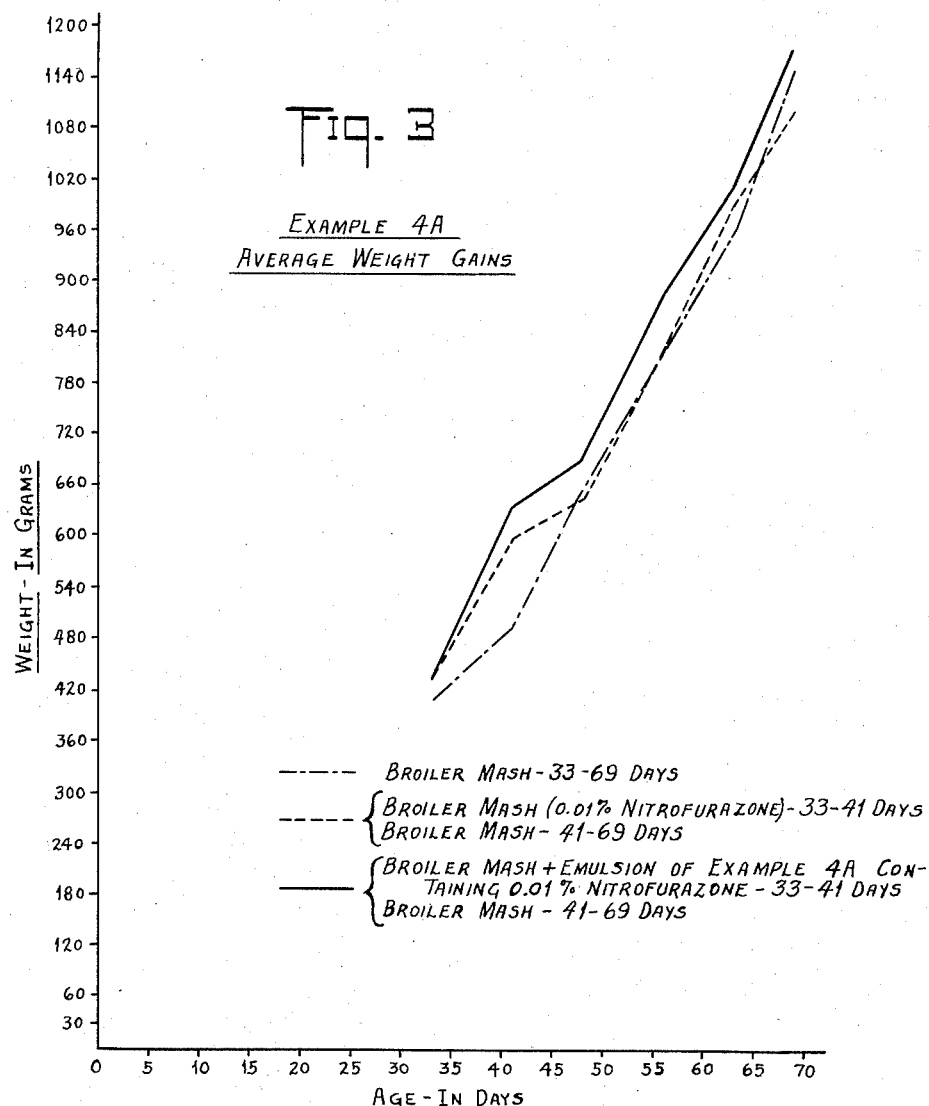

2,856,328

POULTRY FEED CONTAINING A COCCIDIOSTAT

Millard G. Terry, Jr., Holtsville, Samuel M. Weisberg, East Islip, and Becker Habighurst, Patchogue, N. Y., assignors, by mesne assignments, to National Dairy Products Corporation, New York, N. Y., a corporation of Delaware Application April 3, 1953, Serial No. 346,567

10 Claims. (Cl. 167—53.1)

The present invention relates to a composition useful as a poultry feed and to a method of making the composition.

It is known in the art that certain compounds such as nitrofurazone and various para-substituted derivatives of phenylarsonic acid, e. g., 3-nitro-4-hydroxy-phenylarsonic acid, are effective in the treatment of coccidiosis and other types of protozoic infections in poultry. The compounds are customarily administered to poultry in admixture with the feed mash or drinking water.

It has been observed and reported in the literature that nitrofurazone and 3-nitro-4-hydroxy-phenylarsonic acid when mixed at therapeutic levels with poultry mash and fed to chickens may have certain toxic effects resulting in growth retardation, morbidity and even death. Within the knowledge of the inventors these findings reported in the literature are accurate. The toxicity of these coccidiostats limits the amounts that can be fed or administered to poultry.

Coupled with the fact that these antiprotozoan compounds are toxic is the fact that they have a very disagreeable odor and taste to poultry and therefore effective curative levels of such compounds in either a poultry mash or drinking water are often unpalatable. There is thus another reason why the use of such compounds in the treatment of poultry has been limited to small dosages.

In the case of nitrofurazone even further complications arise because of the fact that this compound is relatively water-insoluble and in the dry form exhibits an electrostatic charge. The limited solubility of the compound prevents its use in drinking water in curative amounts. The electrostatic charge possessed by the dry form of the compound renders it difficult to obtain a good dispersion of the compound in feed mash because, when the compound is admixed with mash, it tends to migrate toward the walls of the mixing vessel and as a result there is an uneven distribution.

In accordance with the present invention, there is provided a composition comprising an antiprotozoan compound in a highly palatable and nutritive form. Upon administration of this composition to poultry in the treatment of coccidiosis curative effects can be obtained substantially without toxicity. The composition can contain milk solids and the antiprotozoan compound in combination with this component displays particularly desirable properties. Compositions containing the antiprotozoan compound and fatty material also are within the scope of the invention.

The now preferred compositions include both milk solids and a fatty material in combination with the antiprotozoan compound; these combinations have been found to produce outstanding curative effects unaccompanied by toxic effects. In fact in such compositions substantially higher levels of the antiprotozoan compound can be incorporated than are tolerated in many compositions heretofore employed, such as dry poultry mashes including an antiprotozoan compound. In addition, these compositions have the advantage of providing well-balanced supplemental nutrition, which is important when poultry are in a weakened or run down condition.

Not only can the antiprotozoan compound be administered in curative levels in the various compositions of this invention but also it has been observed that a prophylactic effect may be obtained after cure has been effected in that a resistance to reinfection is exhibited by poultry which have been cured of coccidiosis.

A preferred form is a relatively thick emulsion which has a body highly acceptable to poultry. The consistency of this emulsion should be such that when placed in a suitable container it can easily be picked off by the chickens without too much difficulty and yet descend slowly into the receptacle. Thus it is readily available to the chickens and thus can be consumed completely. An emulsion of this type contains, in addition to the milk solids, fat and antiprotozoan compound, a thickening or bodying agent and desirably an emulsifying agent to assist in maintaining the dispersion in a stable condition. These components are not essential in a powder, even though a powder may be prepared, as will be evident later, by drying an aqueous emulsion of the composition.

The term "antiprotozoan compound" is used herein to refer to compounds having a curative effect against coccidiosis. Typical of this class of compounds are nitrofurazone and the phenylarsonic acids, e. g., 4-hydroxy-phenylarsonic acid and its substitution products, such as 3-nitro-4-hydroxy phenylarsonic acid.

As a source of milk solids any milk product can be used in the composition. Typical are, for example, wheys derived from casein, cheddar and cottage cheese manufacture, delactosed whey, hydrolyzed whey in which the lactose is enzymatically hydrolyzed, deproteinated whey, cottage cheese, buttermilk, skim milk and whole milk. Hydrolyzed whey, in particular, has been found to be extremely palatable to poultry. The milk solids should include a proportion of casein protein to help drying operations and therefore hydrolyzed whey would usually be used with another source of milk solids such as skim milk or buttermilk. The milk product is preferably used in a concentrated or dried form in order to obtain a composition whose solids content is sufficiently high to give an emulsion of fairly thick consistency. The desired solids content will be discussed more fully hereinafter.

Any fatty material can be used, for example, animal and vegetable fats, including lard, wheat germ oil, soya bean oil sludge, butter fat, soya bean oil, tallow and the like.

Typical bodying agents include starch, such as potato and pearl starch, cereal flour, such as high gluten flour, soya flour, oat groat flour, corn flour and gums of vegetable or animal origin, such as locust bean gum, the alginates, etc., ethyl cellulose and sodium carboxy methyl cellulose.

Any nontoxic edible emulsifier is useful. Soya phospholipids are preferred. Other edible emulsifiers such as fatty acid esters can be used.

In the formulation of the aqueous emulsion the amounts of the various ingredients will depend upon the desired effect. The amount of antiprotozoan compound to incorporate is determined by the dose which is to be administered to the poultry and the proportion in the composition will vary, depending upon whether the end product is an emulsion or dry product and by the need for a prophylactic or curative level. A good nutritive balance is especially advantageous. Towards this end, the amount of milk solids, on a solids basis, is preferably from about 13% to about 50% by weight (30% to 92.5% on dry basis). The amount of fatty material is preferably from about 4% to about 30% (7.5% to 70% on dry basis). With these proportions of milk solids and fatty material, from 9 to about 11% of a bodying agent by weight usually is sufficient to achieve a good gelling or thickening action. An emulsifying agent would be used in the amount required to assist stability of the emulsion, which usually is about 1% to 2% for these proportions of ingredients of the emulsion. The balance of the emulsion is water and generally the amounts of the respective ingredients and the solids content of the milk product are adjusted to give an emulsion containing about 35% to about 45% solids by weight which if it contains a bodying agent will possess a consistency that is attractive to poultry.

The ingredients of the composition can be combined in various ways and, while the procedure to be described represents a preferred embodiment due to the especially advantageous properties of the compositions obtained thereby (see the examples) those skilled in the art will perceive other methods which could be used.

In mixing the emulsion the ingredients are blended with sufficient agitation. It is usually preferred to heat the fat to a temperature above its melting point, blend in the emulsifier, if any, and then add the milk solids and other ingredients under agitation while continually heating. The antiprotozoan compound will be incorporated in the liquid fat or in water, depending upon which it is more soluble in. It is also preferable in preparing the emulsion in most cases to heat the emulsion during the late stages of preparation in order to develop the proper viscosity and to pasteurize the produce.

In making the dry composition, it is preferred procedure to prepare an emulsion according to the general procedure given above and then to dry the emulsion in order to remove substantially all of the water and yield a powdered product.

In order to illustrate the invention and the advantages thereof, the following examples are given. Percentages are by weight unless otherwise specified.

Example 1

An emulsion-type medicinal feed was prepared from the following ingredients:

| Ingredients | Percent On Total Weight Basis |
|---|---|
| Condensed Buttermilk (20% total solids) | 74.7 |
| Hydrolyzed Whey (46% total solids) | 10.28 |
| Lard | 4.67 |
| Pearl Starch | 9.34 |
| Yelkin | 0.934 |
| Nitrofurazone | 0.01 |
| 3-nitro-4-hydroxy-phenylarsonic acid | 0.01 |
| Total | 100.0 |

In making the emulsion the emulsifier (Yelkin, a soya phospholipid) and the lard were heated together at a temperature of about 130° F. and thoroughly blended. The nitrofurazone was then blended into this mixture. While agitating the mixture, the starch, condensed buttermilk and hydrolyzed whey were added in the order named and mixing was continued while heating to 150° F. Thereafter steam was injected into the mixture and the temperature was raised to 188–90° F. while continuously stirring. This temperature was maintained for five minutes and thereafter the resulting emulsion was packaged and allowed to cool. The final emulsion had a semi-solid consistency and was thick enough to be easily picked up by poultry.

Example 2

An emulsion was prepared from the following ingredients:

| Ingredients | Percent On Total Weight Basis |
|---|---|
| Cottage Cheese or Bakers Cheese (25% solids) | 57.8%. |
| Spray-dried Delactosed Whey | 3.4%. |
| Lard | 5.77%. |
| Pearl Starch | 11.4%. |
| Bone Meal | 2.30%. |
| Brewer's Yeast | 2.50%. |
| Wheat Germ Oil | 0.47%. |
| Sodium Chloride | 0.11%. |
| Salt Mix containing | 0.55%. |
| (a) Copper Sulfate: 8 gm. | |
| (b) Ferric Lactate: 133 gm. | made up to 2,250 ml. with water. |
| (c) Manganous Sulfate (65% feed grade): 125 gm. | |
| (d) Potassium Iodide: 0.053 gm. | |
| Vitamin A Oil (1,000,000 USP IV units/gm) | 0.0001%. |
| Yelkin | 0.99%. |
| Calcium Chloride | 0.11%. |
| Soya Bean Oil | 3.5%. |
| Vitamin D Yeast (6,000,000 USP units of Vit. $D_2$/lb.) | 0.02%. |
| Calcium Pantothenate | 0.0001%. |
| Water | 11.5%. |
| Nitrofurazone | 0.01%. |
| 3-nitro-4-hydroxy-phenylarsonic acid | 0.01%. |

In making the emulsion the lard was heated to a temperature of about 130° F. and the emulsifying agent was blended in with stirring. Next nitrofurazone was added to the melted fat with stirring. The 3-nitro-4-hydroxyphenylarsonic acid was separately mixed with the water and the pearl starch, cottage cheese, delactosed whey and water were added to the melted fat in the order named. The resultant mixture was heated to 120–30° F. with continuous stirring and the remainder of the ingredients were added. Thereafter steam was injected into the mixture raising the temperature to 188–90° F. which temperature was maintained for a period of 5 minutes. Preparation of the emulsion was completed by transferring the mixture to individual packages. The emulsion had about the same consistency as the emulsion of Example 1.

Example 2A

Red-Rock cross straight run chicks (1156) were fed experimental diets with sufficient controls from birth through 41 days of age.

One portion of the chicks (group I) were fed unmedicated broiler mash supplemented with the emulsion of Example 2 without the nitrofurazone and phenylarsonic acid, for the first 16 days of age and thereafter they were placed on the unmedicated control broiler mash. A second portion (group II) was fed the same ration up to 24 days of age. A third group of chicks (group III) was fed only the unmedicated broiler mash.

At 24 days of age all of the chicks were stricken with acute cecal coccidiosis (causative organism, *E. tenella*) confirmed by laboratory diagnosis. Immediately the supplemental emulsion of Example 2 was restored to the diet of chicks of groups I and II and the diet was maintained for an additional 84 hours after which the chicks were fed only the unmedicated broiler mash through 41 days of age.

The results of these experiments are illustrated in Figures 1 and 2. In Figure 1 there is plotted the age of the chicks in days vs. the average weight in grams for each group. It is observed that the chicks in groups I and II at 41 days of age average 19.3% and 18.2% heavier than the chicks of group III which were fed only the control broiler mash.

In Figure 2 there is plotted the age of the chicks in days against collective mortality of the chickens in each group. It is observed that the collective mortality of the chickens in group III was 29.2%, extremely high after the outbreak of coccidiosis. On the other hand there was no significant increase in the collective mortality of the chickens in group I which were fed a supplemental diet of medicated emulsion. There was a collective mortality of 2.17% and 1.02% for the chickens of groups I and II respectively. The results graphically illustrate the effectiveness of the composition of this invention.

Example 3

An emulsion type medicinal feed was prepared from the following ingredients:

| Ingredients | Percent On Total Weight Solids |
| --- | --- |
| Buttermilk (dry solids) | 12.6% dry solids. |
| Condensed Whey (48% total solids) | 31.64%. |
| Delactosed Whey (28% total solids) | 15.3%. |
| Wheat Germ Oil | 2.55%. |
| Corn Flour | 8.58%. |
| Vitamins A and D oil (4,000 units Vitamin A/800 units Vitamin D). | 1.12%. |
| Nitrofurazone | 0.01%. |
| 3-nitro-4-hydroxy-phenylarsonic acid | 0.01%. |

The emulsion was prepared by heating the wheat germ oil to a temperature in excess of 100° F. and blending in the nitrofurazone. Thereafter the corn flour, condensed whey, delactosed whey, buttermilk and vitamins A and D oil were added in the order named while continuously stirring the mixture and raising the temperature to about 150° F. Sterilization of the resulting emulsion was effected by heating the emulsion thereby raising the temperature to 188–90° F. and maintaining that temperature for about 5 minutes. (See U. S. Patent No. 2,620,274.)

Example 4

An emulsion was prepared according to Example 2 omitting the 3-nitro-4-hydroxy-phenylarsonic acid from the formulation.

Example 4A

Red-Rock cross straight run 33-day-old chicks (320) having chronic intestinal coccidiosis by natural infection were fed various diets with suitable controls.

One-third of the chicks (group I) was fed a broiler mash without medication from the 33rd day of their age until the 69th day of their age. A second third of the chicks (group II) was fed broiler mash containing 0.01% nitrofurazone from 33 days through 41 days of age. Thereafter the second third of the chicks were fed broiler mash without medication from the 42nd day through the 69th day. The final third of the chicks (group III) was fed broiler mash without medication plus a supplemental feed comprising the emulsion of Example 4, which contained 0.01% nitrofurazone. The supplemental feed emulsion was fed from the 33rd day to the 41st day and thereafter it was discontinued and the chicks were fed only broiler mash from the 42nd day to the 69th day. The results are illustrated in graphic form in Figure 3 on which is plotted the average weight in grams of the chicks in each group against the age of the chicks in days.

The chicks in groups II and III were cured of the coccidiosis as evidenced by the destruction of the causative organisms by laboratory diagnosis. However, as can be seen from Figure 3, the chicks in group I suffered a severe average weight gain retardation. The chicks in group II also suffered a severe weight gain retardation which became particularly noticeable when the feeding of the medicated broiler mash was discontinued after the 41st day. On the other hand, the chicks in group III experienced noticeably less weight gain retardation, although when the supplemental emulsion was discontinued after the 41st day there was a noticeable slackening in weight gain.

Although not reflected in Figure 3, it was observed that the group of chicks receiving the supplemental emulsion had consistently better vitality, color and general appearance. There occurred no deaths due to the toxicity of the medicant and none due to coccidiosis in group III of the chickens. In group I, however, there occurred a 5% mortality caused by intestinal coccidiosis.

Example 5

An emulsion was prepared according to the procedure of Example 1 except that the 3-nitro-4-hydroxyphenyl-arsonic acid was omitted from the formulation.

Example 5A

In this example 360 Barred Rock straight run chicks were fed experimental diets with sufficient controls from 28 through 63 days of age.

From birth until 28 days of age all of the birds received a control broiler mash. At 57 days of age, naturally occurring *E. necatrix* and *E. tenella* (intestinal and cecal coccidiosis) were present in the droppings of the birds in epidemic numbers. It was observed visually that the birds had extreme diarrhea accompanied by bloody droppings, droopiness, and lowered feed consumption. Medication was started immediately with controls and continued until all of the chicks (except controls) had received the same level of medication. Part of the chicks were fed a medicated emulsion prepared according to the procedure of Example 5 and within a few days these chicks were free of both types of coccidia with only slight growth retardation. Another portion of the chicks were fed broiler mash containing nitrofurazone and, although both types of coccidia were destroyed, the chicks in this group suffered noticeably from the sandpoint of feed efficiency, and weight gain.

Still another portion of the chicks were fed the emulsion of Example 1. These chicks were very quickly freed of both types of coccidia with no retardation of growth. Immediately upon starting the chicks of this group on the emulsion feed there was noted an increased feed efficiency and conversion.

Example 6

Hydrolyzed whey (approximately 46% solids, 28.8 lbs.), was mixed with 67.2 lbs. of condensed skim milk (approximately 30% total solids). Lard (4 lbs.) was melted and into it was blended 0.5 lb. of Yelkin (soya phospholipid) and 31.41 gms. of nitrofurazone. To 20 lbs. of water was added 31.41 gms. 3-nitro-4-hydroxy-phenylarsonic acid. The melted fat mixture then was dispersed in the mixture of whey and skim milk and the dispersion of phenylarsonic acid in water blended in. The mixture was heated to 140° F. and held at this temperature for 20 minutes to pasteurize it. The pH of the resulting product was 5.65, and the solids content 31.32%.

The pasteurized liquid was homogenized at 1250 p. s. i. and 140° F. The homogenizate was passed into a spray-drier at a rate of 4.2 gallons per hour. The air inlet temperature was 300° F. and the air outlet temperature 180° F.

This material can be incorporated in a dry broiler mash at a level suitable either for prophylactic treatment (less than 6% by weight of the mash) or at a higher level (6% or more) to furnish the composition at a curative level for coccidiosis.

Example 7

Example 6 was repeated, with the exceptions that 57.5 lbs. of the condensed skim milk, 38.5 lbs. of the hydrolyzed whey, 32.65 gms. of the nitrofurazone, and 32.65 gms. of 3-nitro-4-hydroxy-phenylarsonic acid were employed.

This product likewise can be incorporated in a dry mash for administration either for prophylactic or curative purposes.

Example 8

Condensed buttermilk (25% total solids, 67.2 lbs.) was added to 28.8 lbs. of hydrolyzed whey (46% total solids).

Lard (4 lbs.) was melted and there was incorporated therein with stirring 0.5 lb. of Yelkin (soya phospholipid) and 28.6 gms. of nitrofurazone. To 20 lbs. of water was added 28.6 gms. of 3-nitro-4-hydroxyphenylarsonic acid. A liquid fat mixture was blended with the buttermilk whey mixture and the whole incorporated with the water containing the phenylarsonic acid. The final batch weighed 120.5 lbs. and had a total solids of approximately 29%. The material was pasteurized at 140° F. for 20 minutes after which the pH was 4.7.

The material was fed into a homogenizer at 140° F. and homogenized at 1250 p. s. i. and then was spray-dried, being fed into the spray-drier at a rate of 4.2 gallons per hour. The air inlet temperature was 300° F. and the air outlet temperature 180° F.

This material is designed and effective against coccidiosis and can be incorporated in a dry mash either in prophylactic or curative amounts.

*Example 9*

Example 8 was repeated with the exceptions that 48.01 lbs. of the condensed buttermilk, 32 lbs. of the hydrolyzed whey, 25.3 gms. of the nitrofurazone and 3-nitro-4-hydroxy-phenylarsonic acid, respectively, 3.3 lbs. of lard, 0.4 lb. of Yelkin and 17 lbs. of water were employed.

This material is useful as a supplement for a dry poultry mash at levels effective for prophylactic treatment or cure of coccidiosis.

*Example 10*

Condensed skim milk (81.1 lbs., 30% total solids) and 54.2 lbs. hydrolyzed whey (46% total solids) were mixed. Coconut oil (5.6 lbs.) was melted and into it was mixed 0.7 lb. of Yelkin, 2.94 gms. of Tenox II (a mixture of butylated hydroxyanisole, propyl gallate and citric acid dissolved in propylene glycol), and 45.9 gms. of nitrofurazone, 3-nitro-4-hydroxy-phenylarsonic acid (45.9 gms.) was mixed in 28 lbs. of water. The liquid fat was blended in the skim milk-whey mixture and the water containing phenylarsonic acid then was mixed in. The mix was pasteurized at 160° F. for 30 minutes after which it had a pH of 5.6.

The material was homogenized at 2250 p. s. i. and 160° F. It was spray-dried being fed into the apparatus at a rate of 4 gallons per hour. The air inlet temperature was 300° F. and the air outlet temperature 180° F.

The dry product is useful in a dry poultry mash for the treatment or prevention of coccidiosis.

The preferred compositions in accordance with the invention preferably have all of the properties necessary to render them highly acceptable to poultry, such as chickens and turkeys, and at the same time furnish a complete feed supplement. This is accomplished by furnishing all of the nutrient factors contributing to the rapid growth and good health of the poultry, in addition to including a sufficient amount of the antiprotozoan compound to aid the poultry in rapidly overcoming the effects of coccidiosis. The emulsion of milk solids, the thickening agent, fatty material and water, to which may be added materials supplying vitamins A and D, are all of the components necessary for a complete poultry feed supplement, inasmuch as they together contain all the essential amino acids, and vitamins A, B, D and E. The emulsion is a well balanced food, enabling poultry to make better use of cereal proteins which are never complete in their amino acid composition.

The invention is not, however, limited to compositions in the emulsion form. Dry premixes useful for incorporation in a mash are described in Examples 6 to 10. This dry composition, as illustrated in the examples, also is effective against coccidiosis and its administration can be continued for prophylactic treatment after a cure has been obtained although at a somewhat lower level in the mash. A 6% concentration of the dry premix in a dry poultry mash provides a satisfactory curative treatment.

The speed with which the compositions of the invention act against coccidiosis is particularly noteworthy. Dry mash compositions containing a coccidiostat will not effect a cure if administration of the composition is delayed until the existence of coccidiosis becomes apparent, and even if administration is begun before it becomes visibly apparent there will still be a high incidence of mortality nonetheless. Administration of the compositions of the invention can be begun even when coccidiosis becomes visible, as evidenced by bloody droppings, and the cure proceeds more rapidly and substantially without mortality.

The compositions of the invention combine maximum palatability to poultry with maximum curative effect and, preferably, maximum nutrition. The palatability of the compositions is especially noteworthy. Nitrofurazone has a bitter after-taste and 3-nitro-4-hydroxy-phenylarsonic acid has an acid and salty taste to the human palate and on the available evidence it appears probable that poultry experiences the same sensations. The compositions of the invention lack these tastes. There is no mere masking or change in the taste of the coccidiostat; it is simply completely absent, and this is taken as an indication of the existence of the coccidiostat in association with one or more of the other components of the composition. At the present time it is thought the milk protein, especially casein, may be associated with the coccidiostat, inasmuch as combinations of skim milk solids with coccidiostat completely lack the taste of the coccidiostat, whereas combinations of hydrolyzed whey with coccidiostat retain some of the coccidiostat taste.

Possibly a molecular or chemical union has taken place. As a result of this, the coccidiostat may be more available against coccidiosis in the compositions of the invention, and this may account for the more rapid cure. This may also have an effect in minimizing or eliminating toxicity, which is a striking property of this preparation.

The uniformity of dispersion of the coccidiostats throughout the composition may be another factor attributing to the therapeutic effectiveness of the composition. In the emulsion form, the coccidiostat undoubtedly exists in an extremely small state subdivision, possibly aided in arriving at this condition by the postulated molecular association or chemical combination with other components of the composition. This also may increase its availability.

Apart from these possibilities it is of course clear that due to the palatability the poultry is interested in consuming the composition which they should have to enable them to overcome coccidiosis, and thus there is no difficulty in persuading the poultry to ingest a curative quantity of the coccidiostat. The maximum amount of coccidiostat ingested can be regulated by adjusting the concentration thereof in the composition since one may rely with some assurance upon the lack of the desire of the poultry to overstuff themselves with the feed. This is also regulated by the amount of the supplement presented to the birds.

The emulsion compositions of the invention have an acidic pH. It is well known that such compositions are useful as flushing compositions. Diarrhea, however, is bad for a weak bird such as one having coccidiosis. Surprisingly, the compositions of the invention do not flush the birds, and this is an additional advantage.

It will be understood that the composition of the feed may be altered considerably as indicated above. Therefore, the embodiments of the invention described above should be considered as illustrative and not as limiting the scope of the following claims.

We claim:

1. A poultry feed capable of effecting a cure of coccidiosis when administered in a sufficient amount and without toxic effects consisting essentially of an aqueous emulsion of a coccidiostat, from about 13% to about 50% by weight of milk product solids and from about 4% to about 30% by weight of an additional edible fat, said milk product solids and fat decreasing the toxic effects of the coccidiostat.

2. The poultry feed obtained by drying the emulsion poultry feed of claim 1.

3. The emulsion poultry feed of claim 1 in which the coccidiostat is nitrofurazone.

4. A poultry feed obtained by drying the emulsion poultry feed of claim 3.

5. The emulsion poultry feed of claim 1 in which the coccidiostat is 3-nitro-4-hydroxyphenyl-arsonic acid.

6. A poultry feed obtained by drying the emulsion poultry feed of claim 5.

7. The emulsion poultry feed of claim 1 containing about 9% to about 11% of an edible bodying agent.

8. The poultry feed obtained by drying the emulsion poultry feed of claim 7.

9. The emulsion poultry feed of claim 1 containing from about 1% to about 2% of an edible emulsifying agent.

10. The poultry feed obtained by drying the emulsion poultry feed of claim 9.

References Cited in the file of this patent

UNITED STATES PATENTS

| | | |
|---|---|---|
| 2,086,766 | Chuck | July 13, 1937 |
| 2,279,421 | Tisdale | Apr. 14, 1942 |
| 2,538,725 | Johnson et al. | Jan. 16, 1951 |
| 2,628,183 | Johnson | Feb. 10, 1953 |

FOREIGN PATENTS

| | | |
|---|---|---|
| 662,328 | Great Britain | Dec. 31, 1948 |

OTHER REFERENCES

Seiden: Manuf. Chem., vol. 21, No. 4, April 1950, pp. 155 and 157.

Drug and Cos. Ind., vol. 70, No. 4, April 1952, p. 527.